United States Patent

[11] 3,584,530

[72] Inventor Clifford W. Andersen
  De Kalb, Ill.
[21] Appl. No. 827,854
[22] Filed May 26, 1969
[45] Patented June 15, 1971
[73] Assignee The Wurlitzer Company
  Chicago, Ill.

[54] ELECTRONIC COMMUNICATION SYSTEM
  16 Claims, 14 Drawing Figs.
[52] U.S. Cl. ................................................. 84/470
[51] Int. Cl. .................................................. G09b 15/00
[50] Field of Search ........................................ 84/470,
  477, 478; 179/1.4; 35/5, 6, 35 C

[56] References Cited
  UNITED STATES PATENTS
  3,001,431 9/1961 Andersen ..................... 84/470 X
  3,470,785 10/1969 Shallenberger et al. ...... 84/470

Primary Examiner—Stephen J. Tomsky
Assistant Examiner—John F. Gonzales
Attorney—Olson, Trexler, Wolters & Bushnell ABSTRACT: An electronic communication system for use in combination with a plurality of electronic keyboard instruments to provide intercommunication between an instructor seated at one of the keyboard instruments and a group of students each seated at a corresponding one of the other instruments. The instruments are interconnected by means of cables and switching circuits to provide private line verbal and musical communication between the instructor and any selected one of the students, to allow the instructor to communicate verbally and musically with selected groups of students, to connect audio aids such as tape recorders or the like to any selected group of instruments, and to connect groups of instruments together on a common communication channel for performing together in ensemble.

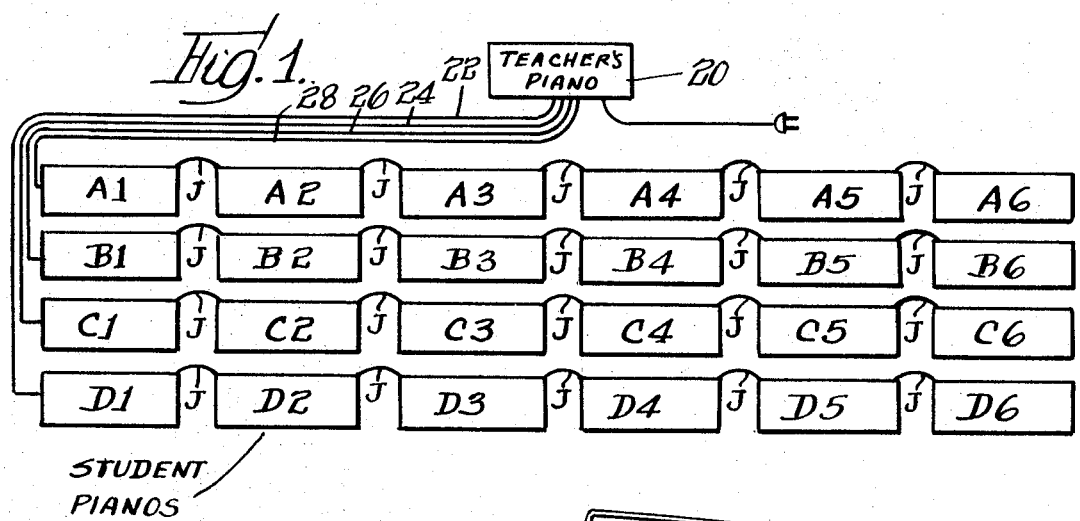
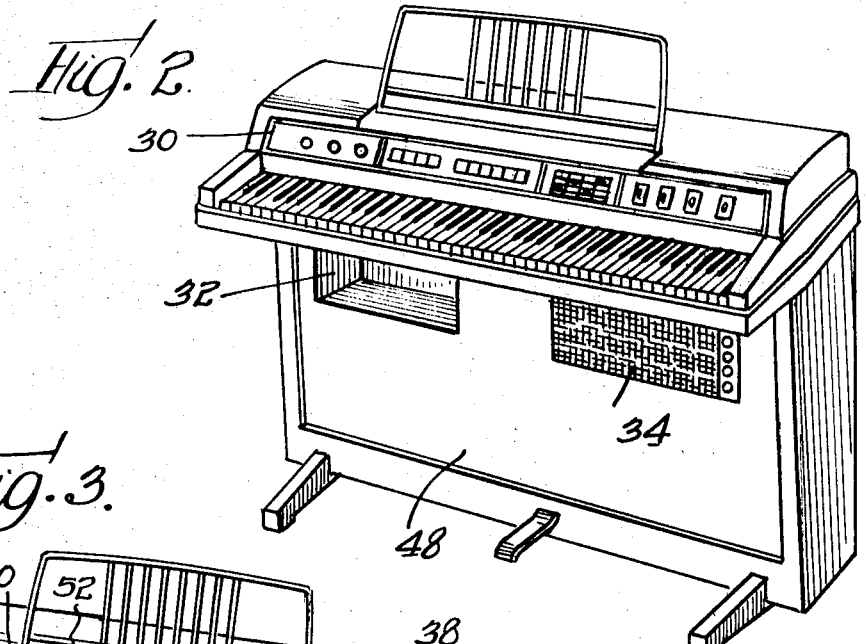
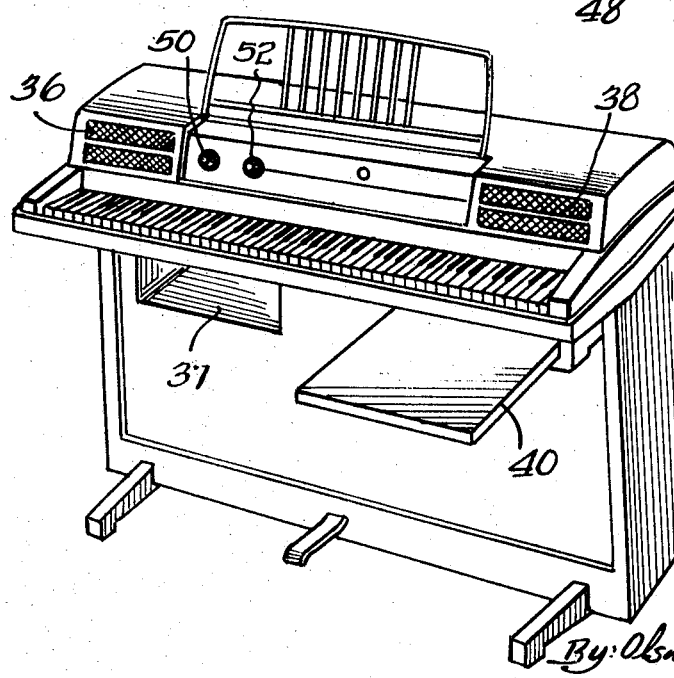

Inventor
Clifford W. Andersen
By Olson, Trexler, Wolters & Bushnell attys

Inventor
Clifford W. Andersen
By: Olson, Trexler, Wolters & Bushnell attys

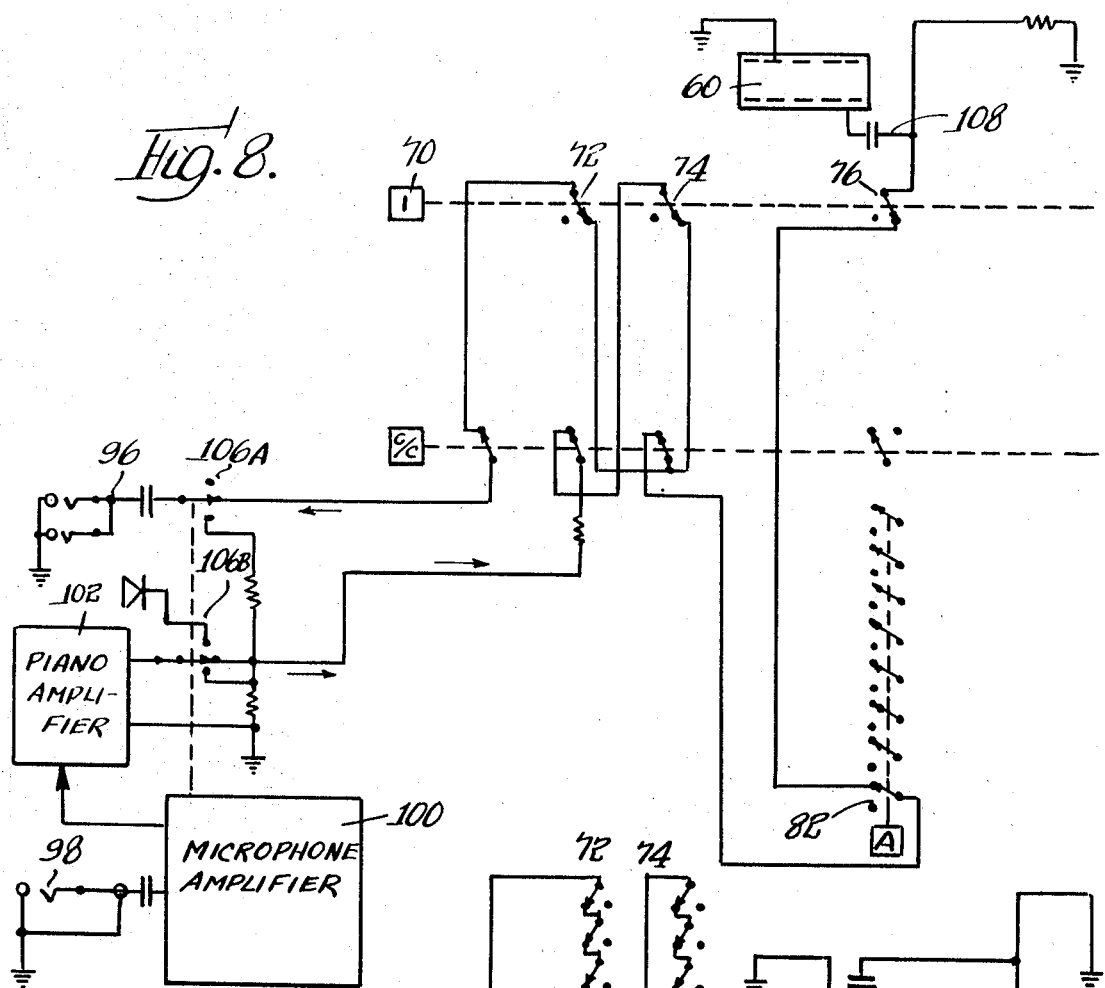
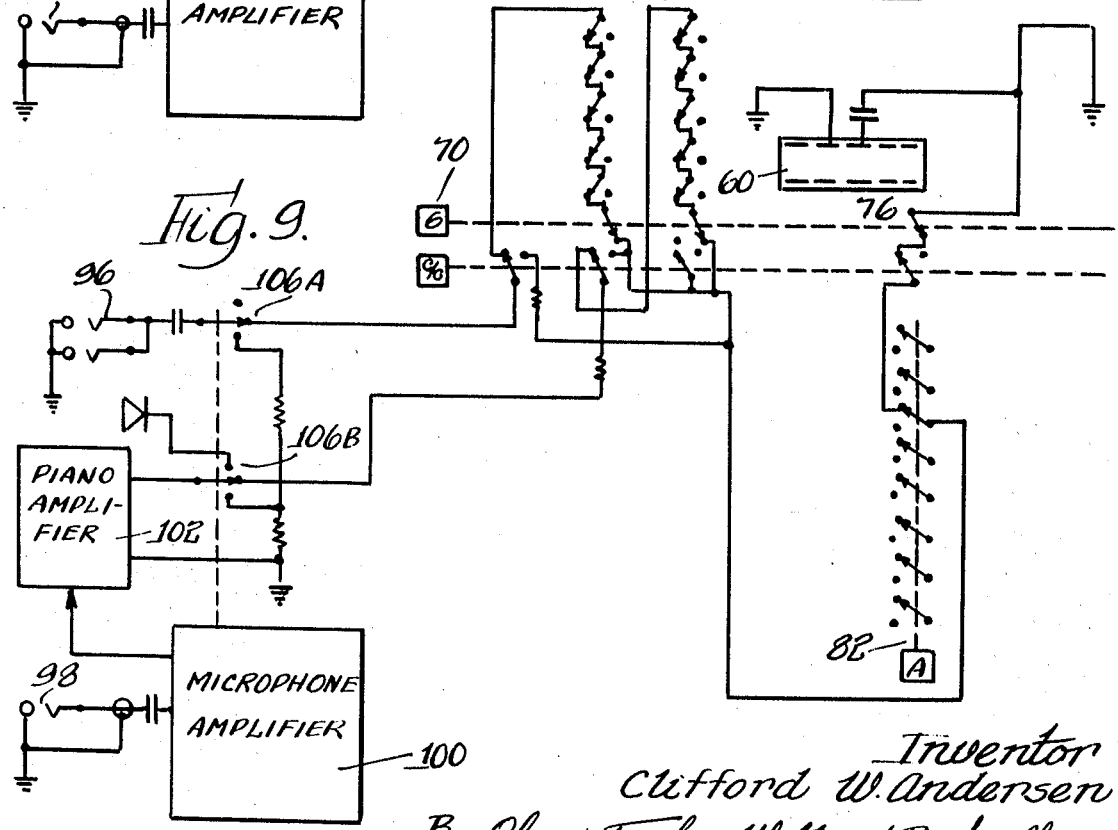

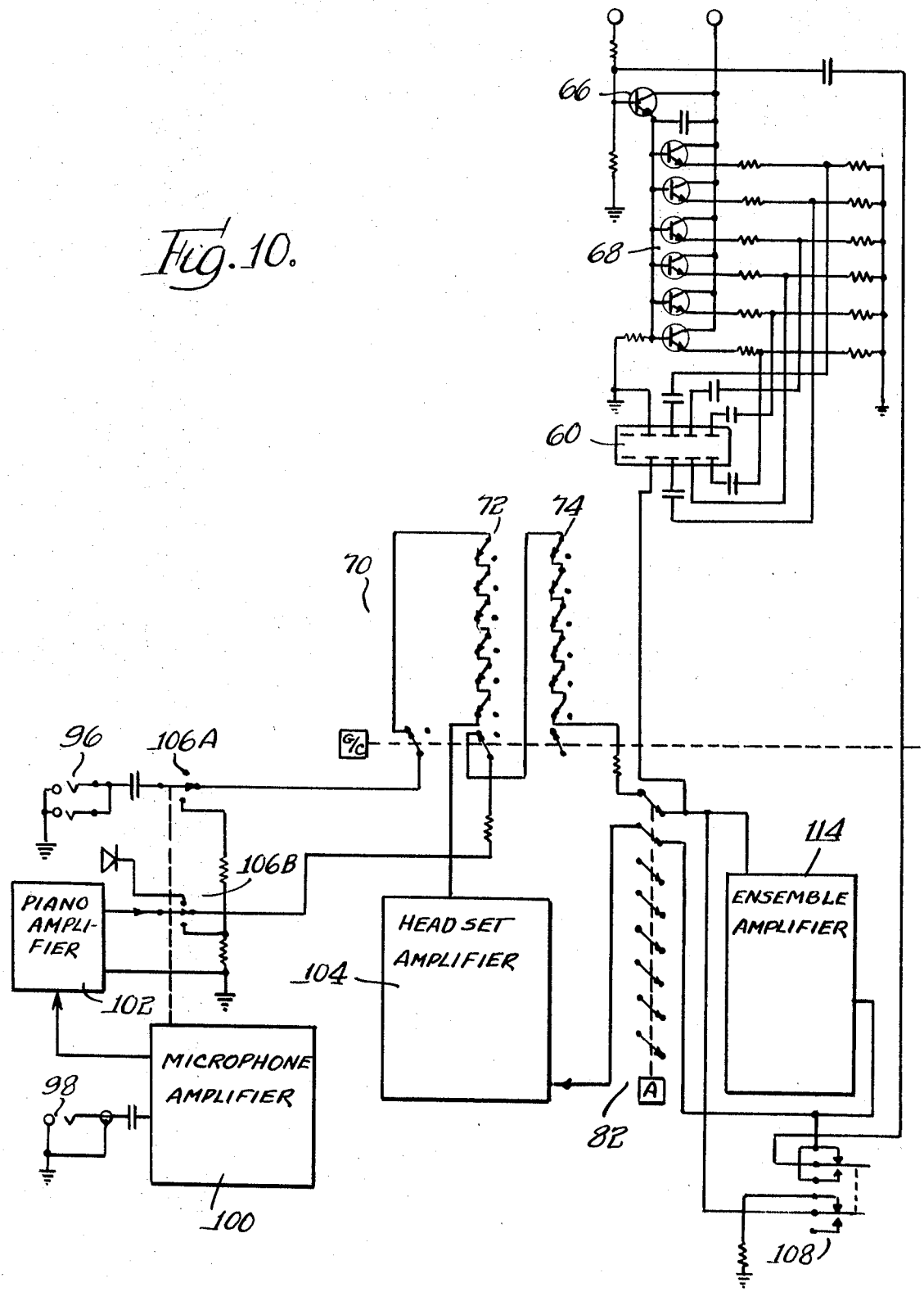

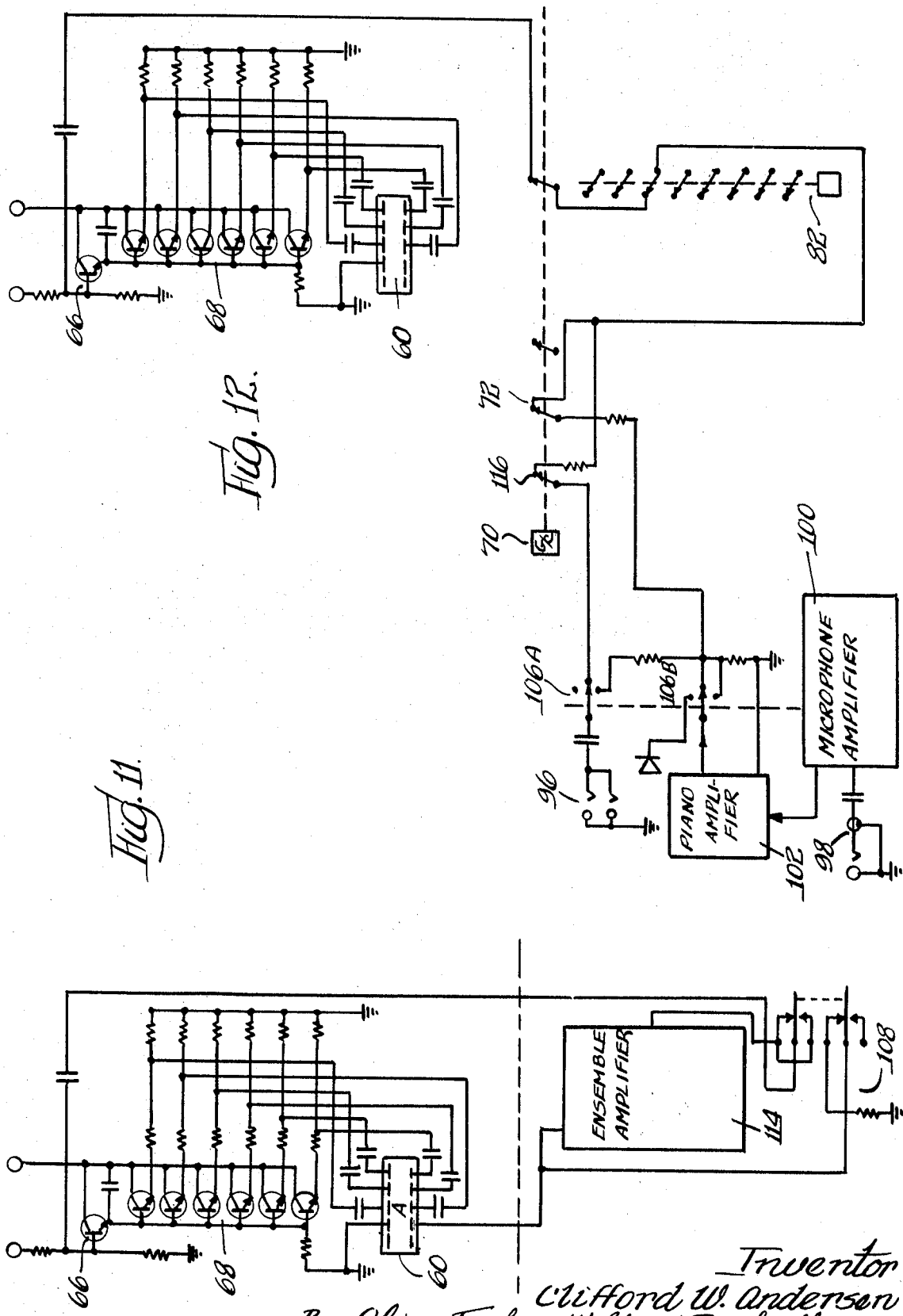

3,584,530

ELECTRONIC COMMUNICATION SYSTEM

BACKGROUND OF THE INVENTION

In recent years an improved method of piano teaching has been devised which capitalizes on the inherent features of electronic pianos. As is known, electronic pianos generate electrical signals that duplicate the sound of corresponding piano notes and achieve the audible sounds of the instrument by applying the electrical signals to a loudspeaker system. Therefore, by utilizing a headset instead of a loudspeaker, it is possible for a student to practice upon an electronic piano without disturbing anyone in his immediate vicinity since the sound of the piano would, under those conditions, be heard only through the headset. This advantage has been utilized by placing a group of electronic pianos together in a single room and providing cable communication between the student pianos and a central instructor's piano so that the instructor can sit in the same room with a large number of students, each of whom can practice independently without disturbing each other, while the instructor is able to monitor any one of the student pianos on his headset, talk to the student by means of a microphone, and demonstrate the proper playing of the piano over the same communication channel. Needless to say, this was a great advance in the art of teaching the piano, which in the past had been handicapped by the necessity of providing separate practice rooms for individual students due to the loud noise generated by the practicing students. Such prior art teaching systems are, for example, disclosed in my copending application, Ser. No. 661,978, which was filed on Aug. 21, 1967 for an "Electronic Communication System," now U.S. Pat. No. 3,475,833.

Although such electronic piano teaching systems have been highly successful in achieving their initial objectives, certain problems have been encountered in grouping large numbers of pianos together on the same circuit, and this invention is directed toward improvements in the switching circuitry of the communication system so that a large number of student pianos can be adequately managed by one instructor and also to improvements for enhancing the type of communication function that can be performed by the instructor. In addition, this invention is also concerned with providing improved amplifier means which are adapted to the particular amplification needs inherent in the above-described communication switching network.

SUMMARY OF THE INVENTION

In accordance with this invention, the above-noted objectives are achieved by dividing the student pianos into a plurality of groups which each contain an equal number of pianos and providing two banks of selector switches, one bank for selecting the piano number within an individual group, and the other bank for selecting the group number, and interconnecting the switches of the two banks in such a way that the instructor can make a private connection with any of the student pianos by simply pressing the appropriate two buttons. An additional switch is provided so that the instructor can, if desired, be connected simultaneously to an entire group of pianos for addressing all of the students in that group simultaneously. In addition, switch means are provided for connecting any one of several audio aids such as tape recorders or the like to each of the individual groups of pianos for recording or for playback purposes. A plurality of amplifiers are provided for amplifying the various audio signals involved. Switching circuits are also provided for connecting groups of students together on the same communication channel, with or without the instructor, for practicing together in ensemble. The above-noted switching circuit is connected so as to perform various other functions and provide various other advantages as will be described below with reference to the attached drawings, which show one illustrative embodiment of the invention.

DESCRIPTION OF THE DRAWINGS

FIG. 1 is a block diagram showing an instructor's piano connected by means of cables to four groups of student pianos with six pianos in each group.

FIG. 2 is a perspective view of one illustrative instructor's piano.

FIG. 3 is a perspective view of one illustrative student piano.

FIG. 8 is a partial schematic diagram showing the conductors which are operatively connected together when the instructor is connected on a private line with the first piano of the first group of student pianos.

FIG. 9 is a partial schematic diagram showing the conductors which are operatively connected together when the instructor is connected on a private line with the sixth piano of the first group of student pianos.

FIG. 10 is a partial schematic diagram showing the conductors which are operatively connected together when the instructor is connected in ensemble with all of the pianos in the first group of pianos.

FIG. 11 is a partial schematic diagram showing the conductors which are operatively connected together when all of the student pianos of one piano group are connected together in ensemble.

FIG. 12 is a partial schematic diagram showing the conductors which are operatively connected together when the instructor is simultaneously communicating with all of the students of the first group of pianos.

DETAILED DESCRIPTION

Figure 4:
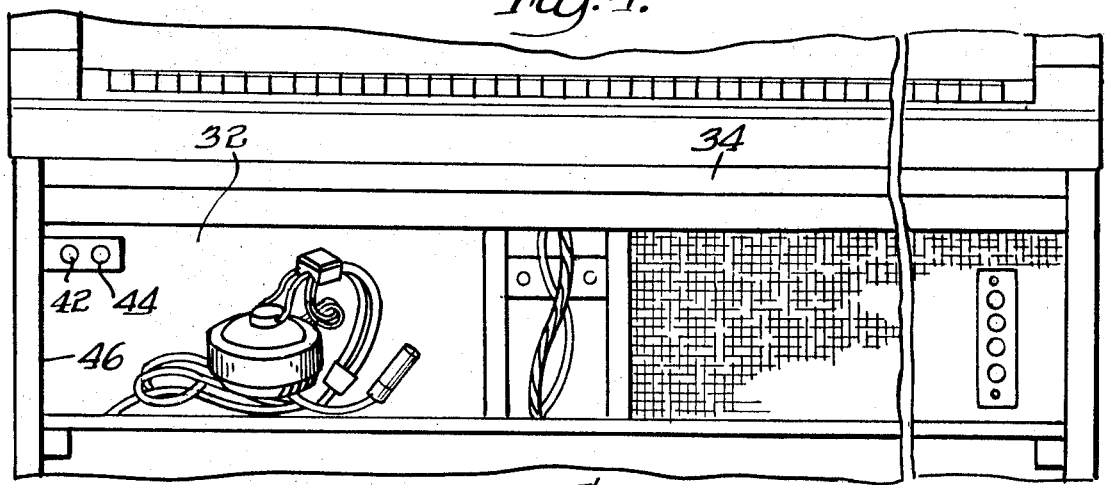
FIG. 4 is an elevation view of a portion of the front of the instructor's piano shown in FIG. 2.

FIG. 1 is a block diagram showing an instructor's piano 20 which is connected by means of four cables 22, 24, 26, and 28 to four corresponding groups of student pianos A, B, C, and D, each of which groups include six student pianos. Each of the student pianos in the groups is interconnected in series with the other pianos in the same group by means of jumper cables J. Each of the jumper cables J contains the same number of conductors as the cable that extends from the teacher's piano to the first student piano of the group, and these jumper cables are connected together within the various pianos so that the teacher can make an individual private line connection with any one of the six pianos in the group. In addition, a common conductor is provided for ensemble purposes, so that in a group of six pianos, a minimum of seven conductors is required in the corresponding cable and jumper cables, six of the conductors being used for private line connections with a corresponding one of the pianos in the group, and the seventh being used as a common conductor. The particular manner in which this is done will be described in detail later in connection with the switching circuits in the student pianos and in the instructor's piano.

FIGS. 2 and 3 show perspective views of a typical instructor's piano and student's piano used in connection with this invention. The instructor's piano is shown in FIG. 2 and, as can be seen in the drawing, one of the important features of this invention is that the communication switching controls are all conveniently and attractively mounted on the drop rail 30 of the instructor's piano. The front panel controls are shown more clearly in FIG. 6 and will be described in detail later. Referring again to FIG. 2, a storage opening 32 is provided at the left-hand side of the instructor's piano underneath the keyboard for storage of a headset, microphone, and teaching materials. A speaker system is mounted on the right side of the instructor's piano below the keyboard opposite the storage space 32. The speaker system is covered by a baffle 34.

The student's piano shown in FIG. 3 differs from the instructor's piano in that a smaller number of front panel controls are required which makes it possible to mount the speakers for the student piano on the opposing ends of the drop rail as indicated by the baffles 36 and 38, each of which covers a corresponding speaker. By placing a treble speaker system on the right-hand side of the piano under baffle 38 and a base speaker system on the left-hand side under baffle 36, a rather pronounced stereo effect is obtained when the speaker system of a piano is utilized. The student piano contains a storage space 37 for a headset, microphone, and other materials, and a pullboard 40 is mounted on the other side of the piano under the keyboard for supporting study materials, etc.

FIG. 4 shows an enlarged view of the storage opening 32 on the instructor's piano with the front panel thereof removed to illustrate a novel arrangement for protecting the headset and microphone from being stolen. In the past, headphone and microphone jacks have been mounted on the instructor and student pianos in an exposed location so that the headphones and the microphones could be plugged into and out of the jacks at will. It has been found, however, that this arrangement results in a relatively high loss of the headsets and the microphones due to theft and accordingly a modified mounting for the headset and mike jacks has been devised in accordance with this invention to prevent such loss. As shown in FIG. 4, the mike jack 42 and headset jack 44 are mounted adjacent to the side 46 of the piano so that when the headset and microphone are plugged in, the plugs will be covered by the lower front panel 48 of the piano (FIG. 2) so that the plugs cannot be withdrawn from their jacks without removing the front panel. The front panel itself is not shown in FIG. 4, but by comparing FIG. 4 to FIG. 2 it will be seen that when the front panel 48 is attached in place, it will cover the two jacks 42 and 44 as described above and prevent the microphone and headset plugs from being removed. The four jacks which are shown in FIGS. 2 and 4 at the right side of baffle 34 are input jacks for various audio aids such as tape recorders or the like and will be described later in connection with the specific switching circuits for this invention.

Figure 6:
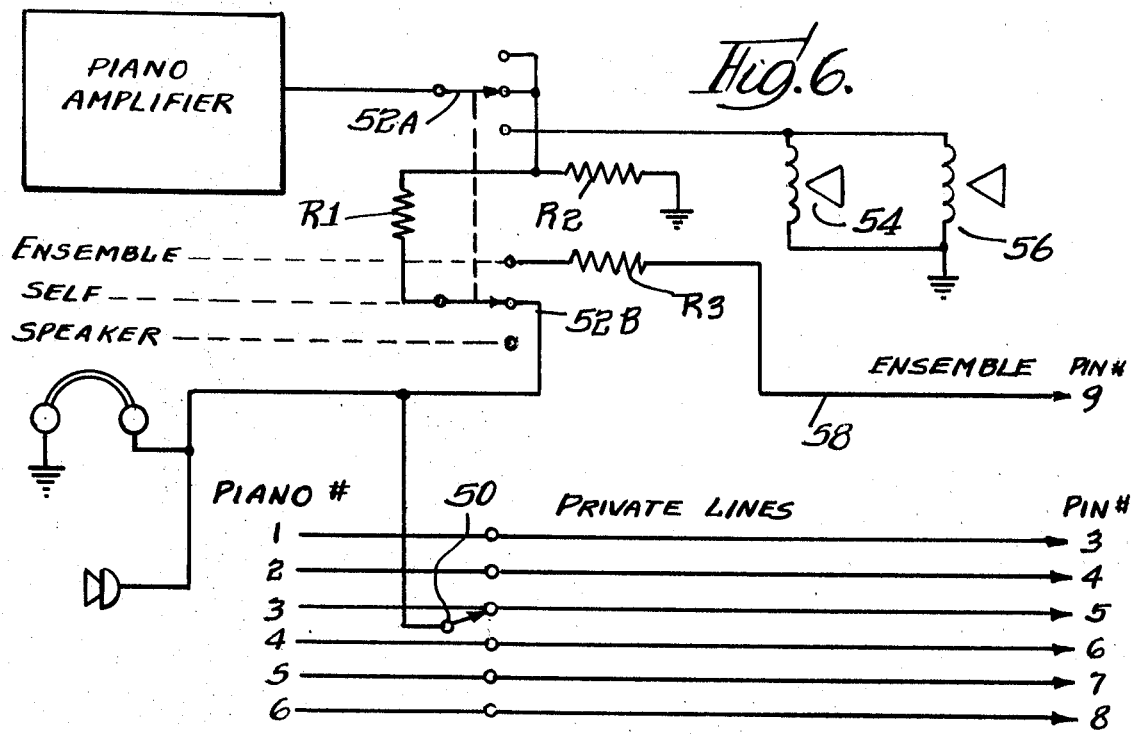
FIG. 6 is a schematic diagram of the electrical wiring for the student piano of FIG. 3.

FIG. 6 shows the switching circuitry used in the student piano. The horizontal conductors in the lower portion of the drawing which are labeled "piano number" are each connected to a corresponding pin on a plug mounted in the rear of the piano where each of the six conductors makes contact with a corresponding conductor leading to the instructor's piano by means of the cables extending from the instructor's piano to the student piano groups and the jumper cables connected thereinbetween. The mounting details for the plugs on the instructor's piano and on the student's pianos are disclosed in detail in the above-noted copending application, and since the same type of cable connections are used in this invention the detailed structures have not been shown herein.

A six position selector switch 50 is mounted on the front panel of the student's piano for connecting the student headphone input and microphone output to any selected one of the six private line conductors. It will be understood by those skilled in the art that each of the pianos in any one group will normally be set to a distinctive one of the six numbers so as to provide a distinctive private conductor therefor. In addition, the student piano also has a three position switch 52 mounted on the front panel with positions marked "ensemble," "self," and "speaker." This three position switch has two decks which are marked 52A and 52B in FIG. 6. In the "self" position of switch 52, the output from the audio amplifier on the student's piano is coupled through the moveable arm of switch 52A and through resistor R1 to the student's headset so that the student can hear himself play. In addition, the output of the student's piano is also applied via switch 50 to the corresponding private conductor number so that the instructor can monitor the student's piano by simply monitoring the appropriate conductor number. The resistor R2, which is connected between the output of the student's audio amplifier and ground is provided for impedance matching purposes, as will be understood by those skilled in the art.

In the "speaker" position of switch 52, the output of the student's audio amplifier is disconnected from the student's headset and from the corresponding private conductor and coupled directly through switch deck 52A into the student's speaker system which contains two speakers 54 and 56. Speakers 54 and 56 differ in their frequency response characteristics, one of the speakers being more responsive to treble frequencies than to bass, and the other being more responsive to bass frequencies than to treble. The bass speaker is mounted on the left side of the student's piano under the baffle 36 and the treble speaker is mounted on the right side of the student's piano under baffle 38. This mounting arrangement provides a stereo effect in that the treble notes appear to be coming from the right-hand side of the piano and the bass notes appear to be coming from the left-hand side of the piano as they would in a manual piano. This stereophonic effect is, of course, not an essential feature of the invention, but it is a desirable feature inasmuch as students will occasionally practice with their speakers turned on, and in those instances the stereophonic effect provides a correlation between the sound and the location of the keys struck on the keyboard, which is an aid in learning.

In the "ensemble" position of switch 52, the output of the student's audio amplifier is connected through switch decks 52A and 52B and resistors R1 and R3 to an ensemble conductor 58 which connects to a corresponding pin on the plug at the rear of the student's piano where it joins a common conductor that is coupled to the instructor's piano and to all of the student pianos in the same group. With switch 52 in the "ensemble" position, the student cannot hear himself directly, but he can hear himself in ensemble with other pianos by means of connections that are made in the instructor's piano and transmitted back to the student's pianos on the six private line piano conductors. It will be noted that in the "ensemble" position of switch 52, the student's headset and microphone are still connected through switch 50 to the corresponding private line conductor, and any signals which are applied to this conductor by the instructor will therefore be heard by the students as they play in ensemble.

Figure 7:
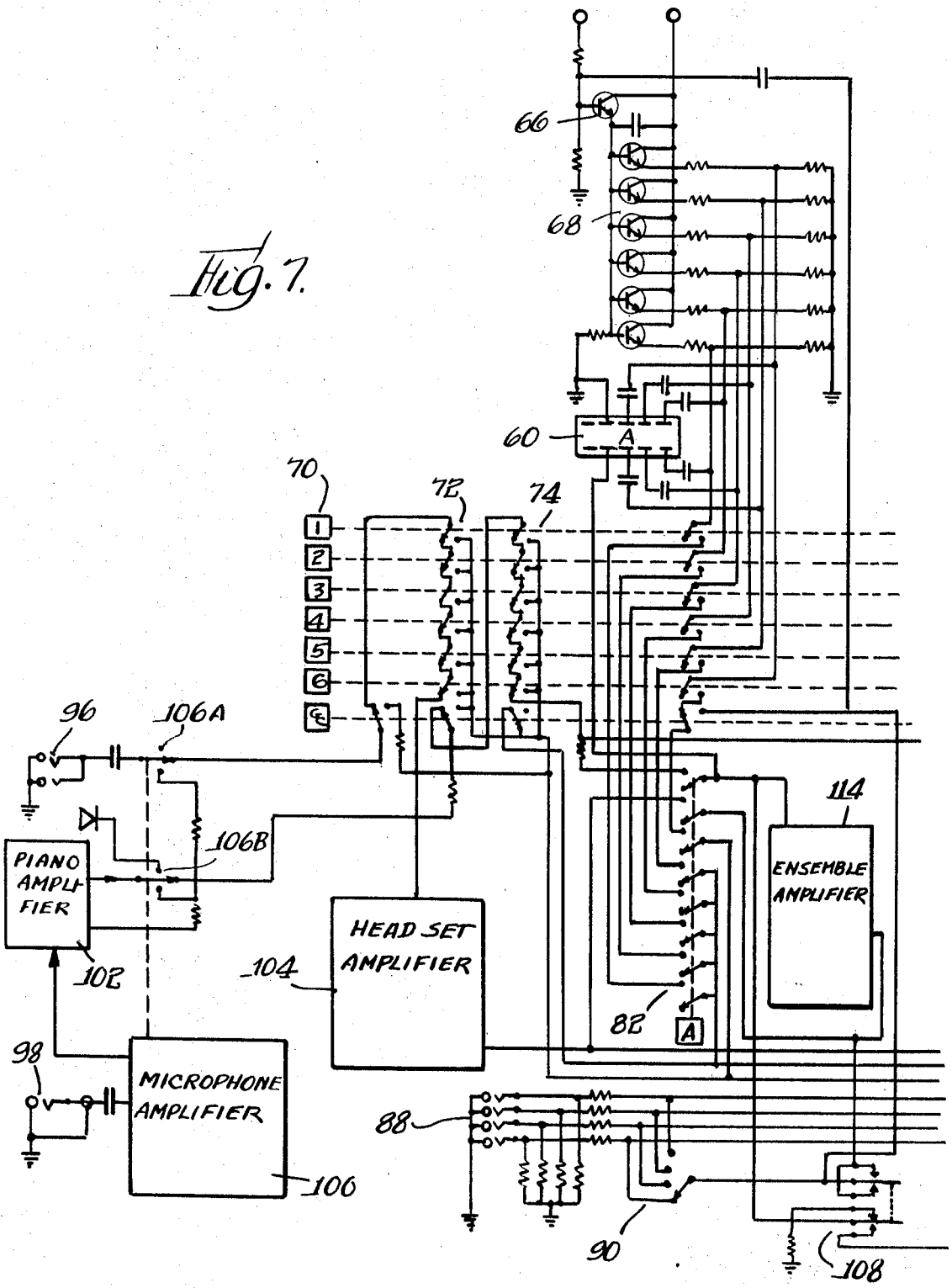
FIG. 7 is a schematic diagram showing the wiring in the instructor's piano that relates to the first group of student pianos.
Figure 7A:
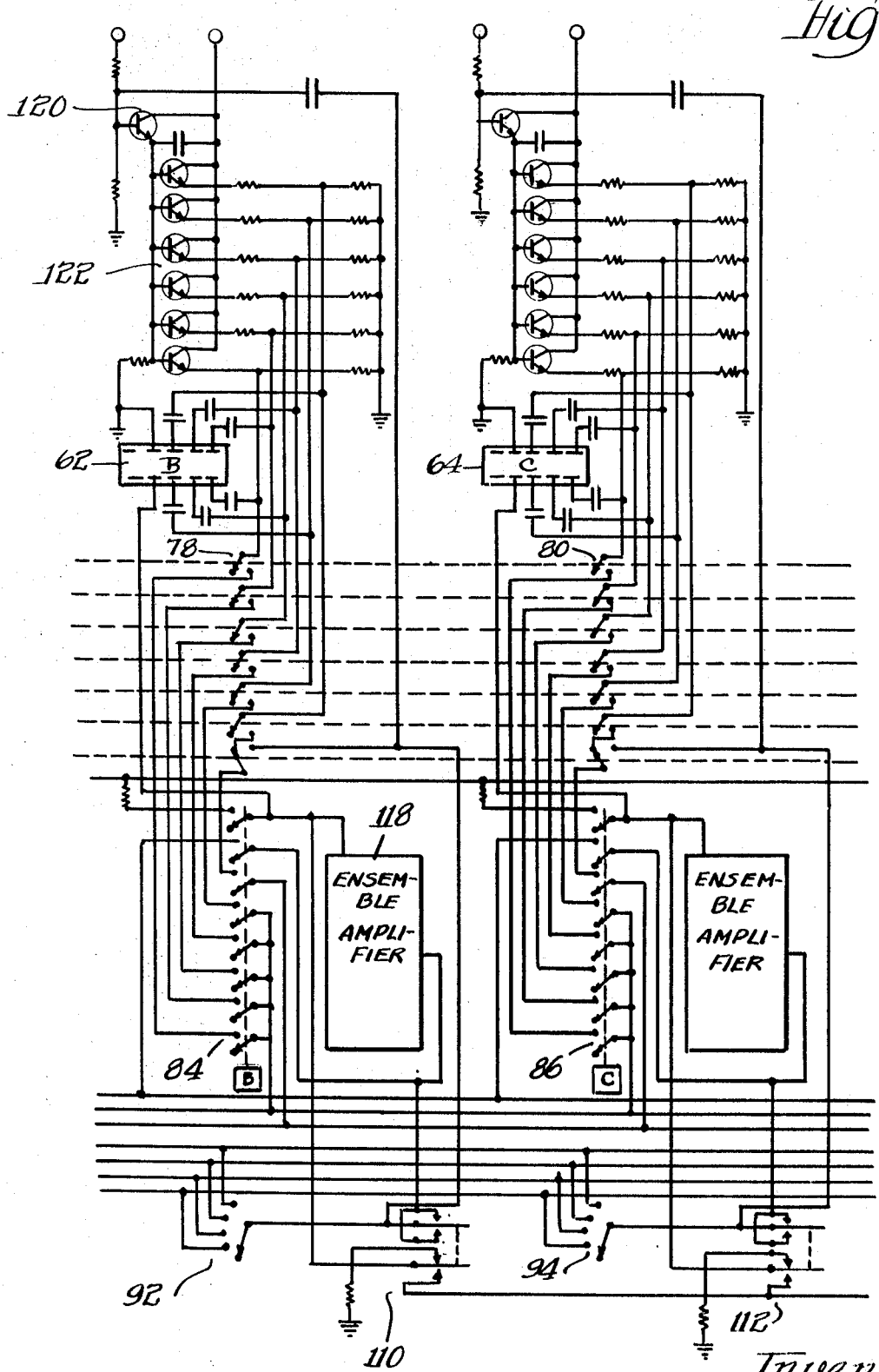
FIG. 7A is a schematic diagram of the wiring in the instructor's piano relating to the second and third groups of student pianos.

FIG. 7 shows the schematic wiring diagram of the switching circuitry in the instructor's piano for the various communication functions with Group A of the student pianos and FIG. 7A is a schematic wiring diagram of the switching circuitry for Groups B and C. Similar switching circuits are included in the instructor's piano for Group D, but inasmuch as these switching circuits are identical to those shown in FIGS. 7 and 7A, and are interconnected in a like manner, the operation of the switching circuits will be described with reference to Groups A, B, and C, with the understanding that the same explanation applies to the same functions performed with respect to Group D.

Referring to FIGS. 7 and 7A, three plugs 60, 62, and 64 are shown for receiving corresponding cables from the first student pianos in Groups A, B, and C. On each of these plugs, the two opposing terminals on the far left of the plug (all of which are shown as unconnected) are used for the alternating current input to the student pianos. The next pair of opposing contacts to the right are the signal ground connection and the common ensemble conductor which was described above in connection with FIG. 6. The remaining three pairs of opposing contacts on each plug correspond to the six private conductors described above in connection with FIG. 6. Thus, in this particular embodiment of the invention, each of the four cables which lead from the instructor's piano to the groups of student pianos contains 10 conductors, two of which carry AC power, one of which is a communication system ground, one of which is a common ensemble conductor, and the remaining six of which are private conductors for each of the six student pianos in the group. It should be understood, however, that this number of conductors is not essential in all embodiments of the invention. For example, in other embodiments of the invention the AC power for the student pianos may be derived from a local plug, and it is also possible to use the common AC ground as the signal ground for the communication system, thereby reducing the number of conductors by three. In general terms, this invention requires a minimum of N+1 conductors extending from the instructor's piano to each of the groups of student pianos, where N is the number of student pianos in the group, but additional conductors can be added if desired, as they have been in this particular embodiment of the invention, to perform additional functions.

Associated with each of the plugs 60, 62, and 64 is an amplifier system having a separate amplification channel for each of the six different private communication contacts on the plugs. Referring to FIG. 7, transistor amplifier 66 receives input signals on its base from a source that will be described later and develops an output signal which is applied to the bases of a group 68 of parallel connected transistor amplifiers. The bases and collectors of transistor amplifiers 68 are all connected in parallel to a common signal source and voltage source as shown in FIG. 7, and the outputs of each of the six transistors is coupled through a capacitor to a corresponding one of the six private communication terminals on plug 60. A similar arrangement of transistor amplifiers is provided for plugs 62 and 64.

Directly below each of the plugs 60, 62, and 64 are a plurality of toggle switches which are actuated by a common pushbutton control 70 shown on the left-hand side of FIG. 7. Pushbutton control 70 contains seven pushbuttons, one for each of the private communication conductors of each student group, and one which is used to contact the entire group as will be explained later. The horizontal dashed lines which extend from pushbutton assembly 70 across FIG. 7 and also across the center of FIG. 7A indicates that each of the switches joined by the same dashed line are ganged together to be simultaneously actuated by the same pushbutton. This means, for example, that when pushbutton No. 1 of pushbutton assembly 70 is pressed, the uppermost switch on each of the switch banks 72, 74, 76, 78, (FIG. 7A) and 80 will be moved to the right. Ganged pushbutton switches of this general type are well known in the art in connection with pushbutton controls for radios and other electrical equipment, and any suitable type of pushbutton control having the desired number of ganged toggle switches can be used in connection with this invention.

In addition to the ganged toggle switches mentioned above, additional decks of ganged toggle switches 82 (FIG. 7) 84, (FIG. 7A) and 86 are provided each of which corresponds to one of the groups of student pianos and each of which contains a plurality of toggle switches which are all ganged together. To establish communication with any particular student piano, the instructor presses one of the switches 82, 84, or 86, depending on which group the desired student is located in, and then the instructor presses the button on pushbutton assembly 70 which corresponds to the piano number in the particular group where the student is sitting. As will be explained below, this connects the instructor and the selected student together on a private line. If the instructor wishes to address all of the students of any one group he does so by pressing the lowermost button labeled "GC" in switch deck 70 along with the button for the particular group he wishes to be connected to. The detailed connections that are made by these actuations of the switches will be described in detail later.

Figure 5:
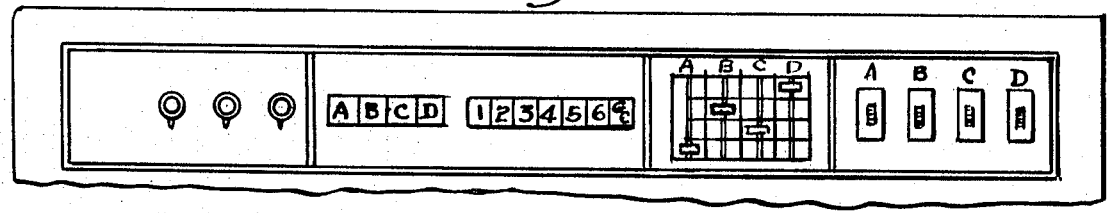
FIG. 5 is an elevation view of the communication system control panel for the instructor's piano shown in FIG. 2.

The pushbuttons for the above-described switches are mounted on the fall board of the instructor's piano within easy reach of the instructor's hand as shown in FIG. 5. The buttons numbered 1—6 and GC correspond to pushbutton assembly 70 and the buttons marked A,B,C, and D correspond to switches 82, 84, 86, and a similar switch for Group D which is not shown in the schematics. At the right of these pushbuttons, four switches are mounted on the fall board of the instructor's piano to control the output from audio aids such as tape recorders, electronic metronomes, or the like. These audio aids are connected to the student pianos as described below.

At the bottom of FIG. 7, four input jacks 88 are shown for receiving the output signals of four tape recorders or various other audio aids. The outputs of these instruments are coupled to bus conductors which extend to audio aid selector switches 90, 92 (FIG. 7A), and 94. By means of these selector switches, which are mounted on the fall board of the instructor's piano as noted above, any one of the four audio aid inputs may be selected and applied to the input amplifiers for the corresponding group of student pianos. For example, by placing switch number 90 in its uppermost position, the output of the corresponding audio aid is coupled from the arm of switch 90 to the base of transistor amplifier 66, whose output is applied in parallel to the transistor amplifiers 68 which amplify the audio aid signal and apply it to each of the six private communication terminals on plug 60. By this means, a recorded passage by an accomplished pianist may be played to all of the students in any selected group for instructional purposes without disturbing the other groups. It will be understood by those skilled in the art that the selector switches 92 and 94 shown in FIG. 7A perform this same function with regard to the inputs of the transistor amplifiers shown at the top of FIG. 7A to apply the audio aid outputs to Groups B and C.

Referring to FIG. 7, a jack 96 is provided to receive the instructor's headset and a jack 98 is provided for the instructor's microphone. The output of the instructor's microphone is coupled by way of an input capacitor to a microphone amplifier 100 whose output is coupled to an audio amplifier 102 that amplifies the output of the instructor's piano. A headset amplifier 104 provides amplification for the audio signals that are applied through the switching network to the instructor's headphone jack 96. The output of the instructor's audio amplifier 102 and the input to the headset jack 96 are controlled by a switch assembly 106 containing two switch decks which are labeled as switch decks 106A and 106B. Switch 106 is mounted on the fall board off the instructor's piano and has three positions marked "self," "ensemble," and "speaker." The switch is shown in the "ensemble" position in FIG. 7.

The operation of the above-noted switches and amplifiers will be described with reference to FIG. 8, which shows the operative connections that are made through the switching network when the instructor establishes private line communication with the first student piano of Group A by pressing button No. 1 on switch deck assembly 70 and the button marked A which closes all of the switches of switch deck 82. For purposes of simplification, only those conductors and circuit elements which are involved in this particular private line communication are shown in FIG. 8. Referring to FIGS. 7 and 8, under the above-noted switching conditions, the output of the appropriate terminal of plug 60 is applied through a condenser 108 and the appropriate toggle switches of switch decks 76, 82, 74, 72 and 106A to the instructor's headset jack 96. This enables the instructor to pick up any signals that are coupled from the student's piano to the private line conductor for that particular piano. Referring to the schematic of FIG. 6, it will be seen that these signals include the musical signals generated by the student's piano amplifier and any vocal communications generated by his microphone.

The output of the instructor's piano amplifier 102, which includes the notes played on the instructor's piano and also any vocal signals developed by the instructor's microphone amplifier 100, are coupled through the switch decks 106B and the lowermost switches of switch decks 72 and 74 onto the said private line connection between the instructor and the student. Accordingly, it will be seen that the private line connection between the instructor and the student enables both the instructor and the student to hear each other's pianos and to hear any vocal comments that the other might make on their respective microphone. This connection is completely private and the instructor can converse freely with this particular student without disturbing any of the others. The instructor can also demonstrate on his own piano the proper way of playing and listen to the student's playing.

FIG. 9 shows the switch connections which establish a similar private line connection between the instructor and the sixth student piano of Group A. The connections in this case are similar to those of FIG. 8 except that a different one of the six private line conductors are selected in plug 60 and the connection is made through different toggle switches. The functions involved and the basic connections are, however, the same as those discussed above in connection with FIG. 8. It will be understood by those skilled in the art that the instructor can establish a private line connection with any one of the students by pressing the corresponding letter and number on his pushbuttons.

In addition to the basic private line communication discussed above with any one of the student pianos, further switching provisions are included for enabling the instructor to communicate with entire groups at one time or to connect the groups in ensemble so that they can play together and communicate with each other. Referring to FIGS. 7 and 7A, these functions are provided by a series of three-position switches 108 (FIG. 7), 110, (FIG. 7A), and 112. Switches 108, 110, and 112 are each three-position switches which are shown in their central "off" position. In the second-switch position, the two moveable arms of the switches are moved upward, and this particular position of the switch is labeled the "ensemble" position. In the third position of the switch, the two moveable arms are moved downward, and this position is labeled the "mix" position. The operation of these switches in the "ensemble" position is illustrated by the schematic diagram of FIG. 10 which shows the operative connections made for the "ensemble" position of switch 108 to connect the instructor in ensemble with Group A. This condition is achieved by placing switch 108 in its upward position, i.e., its "ensemble" position, and by pressing group selector switch 82 for Group A. When this is done, the input to transistor amplifier 66 is coupled through switch 108 to the output of an ensemble amplifier 114 whose input is coupled to the "ensemble" terminal of plug 60. Therefore, referring to the schematic for the student piano which is shown in FIG. 6, when the switches on the individual student pianos are in their "ensemble" position, the musical output of all of the student pianos will be applied as inputs to ensemble amplifier 114 and the output of ensemble amplifier 114 will then be applied back to the transistor amplifiers 66 and 68 to each of the private lines so that every student can hear all of the other pianos in ensemble including his own. In addition, the output of the instructor's piano amplifier 102 is coupled through switch decks 106B, 72, and 74 to the input of the ensemble amplifier 114 so that the instructor's piano will also appear on the ensemble line. The instructor's headset is coupled through switch decks 106A and 72 to the headset amplifier 104 which receives its input through switch deck 82 from the output of ensemble amplifier 114. Thus the instructor is also able to hear the entire ensemble which includes his own piano. The instructor can form the type of ensemble shown in FIG. 10 with any one of the groups of student pianos by switching the appropriate "ensemble" switch and pressing the appropriate group selection button.

The instructor can also form ensembles without being connected into the ensemble circuit himself as is illustrated in FIG. 11, which shows the circuit connections that are operable when the Group A is connected in ensemble by itself without the instructor. In this case, the output of the instructor's piano amplifier is simply not connected to the input of the ensemble amplifier 114 and the output of the ensemble amplifier 114 is not connected to the input of the instructor's headset amplifier 104. These connections are both made through the switch decks 82, 84, or 86 only when one of these switches are pressed. If the ensemble switch 108 is placed in its "ensemble" position without pressing the group selector switch 82, the result will be an ensemble connection as shown in FIG. 11, where the output of all of the student's pianos of Group A are applied to the input of ensemble amplifier 114 with the output thereof being amplified by transistor amplifiers 66 and 68 and applied to the input of all of the private lines for Group A.

FIG. 12 shows the circuit connections that are used when the instructor wishes to talk to all of the students in any one group at the same time. This condition is achieved by pressing the group call button which is labeled "GC" on pushbutton deck 70 and then pressing the group selector switch corresponding to the group selector switch corresponding to the group the instructor wishes to address. In FIG. 12, switch 82 is shown as being pressed to place the instructor in contact with all of the members of Group A simultaneously. Under this switch condition, the output of the instructor's piano amplifier 102 is applied through switch deck 106B, 72, and 82 to the input of transistor amplifiers 66 and 68, whose output is applied to all of the six private lines for Group A simultaneously. This enables the instructor to simultaneously address all of the students in Group A. The input for the instructor's headset jack 96 under these switch conditions is connected through switch decks 106A and 116 to the output of instructor's mike amplifier 100 so that he can hear himself.

Figure 13:
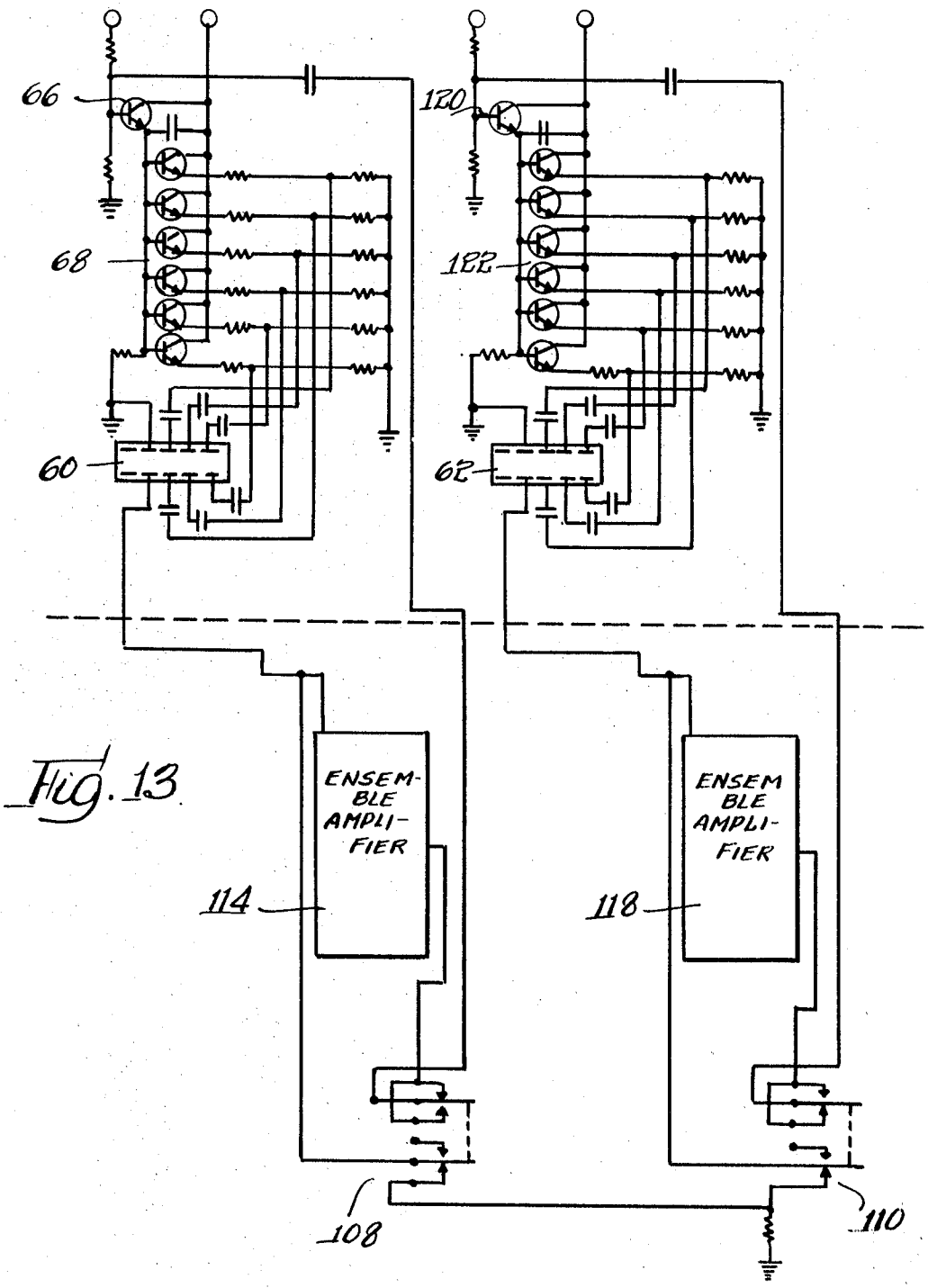
FIG. 13 is a partial schematic diagram showing the conductors which are operatively connected together when two of the groups of student pianos are connected together in ensemble.

It is also possible to mix several of the groups together in ensemble, or all of the groups together in ensemble if desired, by placing the appropriate ensemble selector switches 108, 110 and 112 in the lower position of the moveable arms, this position being designated the "mix" position of the switches. FIG. 13 shows such a combined ensemble circuit for Groups A and B which is formed by placing the switches 108 and 110 in their "mix" positions. In this position of the switches, the inputs to ensemble amplifier 114 and 118 are mixed together so that the outputs of all of the student pianos in both Group A and in Group B are combined together in the output of both ensemble amplifiers. The output of the ensemble amplifiers 114 and 118 are then applied to all of their respective private lines leading to the student pianos as described above. The output connections for ensemble amplifier 114 have been described in the preceding paragraph relating to FIG. 10. The output connections for ensemble amplifier 118 are similar in that the output is coupled via selector switch 110 to the input of a transistor amplifier 120 whose output is applied to a group of parallel transistor amplifiers 122 and from there to the inputs of the six private lines connected to plug 62.

If desired, all of the student pianos can be connected together in ensemble by placing all of the ensemble switches in the "mix" position, but such extensive mixtures would, of course, only be used when it is desired to combine a few students from each section together in ensemble for the benefit of all of the others. If, for example, the instructor wished to form a quartet with one piano from each of the groups, he could do so by actuating all of the "mix" switches as described above, thereby mixing together the inputs from all of the ensemble amplifiers. In this case, however, all of the other students would have to listen to the ensemble, since the output of the ensemble amplifiers are automatically applied to the input of all of the private lines in the circuit.

By providing a plurality of separate amplifiers, the overall amplification problems have been simplified in this invention. It will be understood, of course, that the amplification requirements of the switching circuit vary widely depending upon the function involved. If, for example, the instructor is only talking to one student, very little amplification is required compared to the case where the instructor is talking to a large group of students, and this requirement is obviously increased when the outputs of the student's pianos are combined together in an ensemble. Therefore, if all of these amplification requirements were handled in a common amplifier, the amplifier would only be working at a small fraction of its rated capacity most of the time. By using separate amplifiers which are only switched in when they are needed, this drawback is eliminated and all of the amplifiers work at their full capacity whenever they are switched on. Since solid state components are utilized for the amplifiers there is no problem with respect to warm up time since solid state amplifiers become operational almost instantly after they are switched on.

From the foregoing description it will be apparent that the communication system of this invention provides substantial improvements with respect to the number of functions that can be performed by the instructor in terms of communicating with his students and also that the particular switching circuits and amplifier circuits of this invention perform the complicated switching functions involved with a relatively small number of switch components so that the entire master communication panel can be mounted on the fall board of the instructor's piano within easy reach of his fingers. And although this invention has been described in connection with one specific embodiment thereof, it will be understood by those skilled in the art that many modifications can be made in the particular details of the disclosed circuits without departing from the basic teaching of this document. For example, facilities for handling additional groups of student pianos can be added to the circuit by the simple expedient of adding duplicate switching circuits which perform the same function as described herein. In addition, changes can be made in the transistor amplifier circuits to adapt them for a particular use and many other such detailed modifications will be apparent to those skilled in the art. Accordingly, it should be understood that this invention includes all such modifications which fall within the scope of the following claims.

I claim:

1. An electronic communication system for use in combination with a plurality of electronic keyboard instruments to provide intercommunication between an instructor seated at one of the keyboard instruments and a plurality of students each seated at a corresponding one of the other instruments, each of said electronic keyboard instruments including transducer means for selectively generating electrical musical signals corresponding to the audio tones of that instrument and transceiver means for transmitting and receiving electrical voice signals corresponding to verbal communications, said communication system comprising cable means for connecting said instructor's instrument to each of said student's instruments, said cable means containing at least N+1 conductors where N is the number of student's instruments, plug means on each of said keyboard instruments for receiving said cable means, means for coupling the transceiver means of each student's instrument to a corresponding one of said conductors to establish a private line communication link with said instructor's instrument, whereby N of said N+1 conductors are utilized as private line conductors, means for selectively coupling the transducer means of each student's instrument to the corresponding private line conductor or to the N+1st conductor of said cable means, whereby said N+1st conductor is utilized as a common line conductor, means for connecting the transceiver and transceiver and transducer means of said instructor's instrument to any selected one of said private line conductors for private line voice and/or musical communication with any selected one of said students, and means for coupling said common line conductor to a plurality of said private line conductors to enable a corresponding plurality of students to simultaneously monitor the musical signals of each other's instruments when the transducer means of said instruments are switched to said common line conductor, thereby enabling the said plurality of students to play their instruments in ensemble.

2. An electronic communication system as defined in claim 1 wherein said communication system comprises a plurality of groups of student instruments, each of said groups containing N instruments, and wherein said cable means includes a plurality of cables each extending from said instructor's instrument to a corresponding group of student instruments, each of said cables containing N+1 conductors, each of said student instruments being coupled to their respective cable as defined in claim 1, and further comprising means for connecting the transducer and transceiver means of said instructor's instrument to any selected one of said private line conductors in any selected one of said cables for private line voice and/or musical communication with any selected one of said students, and means for coupling the common line conductor of any selected one of said cables to a plurality of the private line conductors of the same cable to enable a corresponding plurality of students in the same group to simultaneously monitor the musical signals of each other's instruments when the transducer means of said instruments are switched to said common line conductor, thereby enabling the said plurality of students to play their instruments in ensemble.

3. An electronic communication system as defined in claim 2 and further comprising means for coupling the common line conductors of any selected plurality of said cables together to enable a corresponding plurality of students in different groups to simultaneously monitor the musical signals of each other's instruments when the transducer means of said instruments are switched to said common line conductor, thereby enabling the said plurality of students to play their instruments in ensemble.

4. An electronic communication system as defined in claim 3 and further comprising means for selectively coupling the transducer and transceiver means of said instructor's instrument to all of the private line conductors of any selected cable or group of cables to enable the instructor to communicate verbally and/or musically with a corresponding group of students simultaneously.

5. An electronic communication system as defined in claim 4 and further comprising means for selectively coupling at least one external audio aid to all of the private line conductors of any selected cable or group of cables to simultaneously couple said audio aid to a corresponding plurality of student instruments.

6. An electronic communication system as defined in claim 5 and further comprising a plurality of audio amplifiers each coupled to a corresponding one of said private line conductors for amplifying said signals which are simultaneously applied to a group of said private line conductors.

7. An electronic communication system as defined in claim 6 and further comprising an additional plurality of audio amplifiers each coupled to a corresponding one of said common line conductors for amplifying signals applied thereto from the corresponding student instruments.

8. An electronic communication system as defined in claim 2 wherein said means for selectively coupling the transceiver and transducer of said instructor's instrument to any selected one of said private line conductors comprises a first and a second plurality of switch banks, the first plurality of switch banks containing N switch banks, the second plurality of switch banks containing K switch banks where K is the number of said groups of student instruments, and means for interconnecting the switches of said first and second switch banks to selectively couple the transceiver and transducer of said instructor's instrument to a corresponding private line conductor when one switch bank of said first plurality of switch banks and one switch bank of said second plurality of switch banks are actuated simultaneously.

9. An electronic communication system as defined in claim 8 wherein said means for coupling said common line conductors to a plurality of said private line conductors comprises K ensemble switches each operable when actuated in a first position to couple a corresponding common line conductor to all of the private line conductors of the same cable.

10. An electronic communication system as defined in claim 9 and further comprising K audio amplifiers each coupled to a corresponding one of said K ensemble switches for amplifying the signals of the corresponding common line conductor and applying the amplified signals to all of the private line conductors of the same cable.

11. An electronic communication system as defined in claim 10 and further comprising an additional plurality of audio amplifiers connected in K groups with N amplifiers in each group, the inputs of each group of N amplifiers being coupled together in parallel, and the outputs thereof being coupled to a corresponding one of the private line conductors in a corresponding one of said cables, and switch means for selectively coupling the transceiver and transducer means of said instructor's instrument to the input of any selected amplifier group for simultaneous communication with all of the instruments in any selected group of student instruments.

12. An electronic communication system as defined in claim 11 and further comprising K audio aid switches each operable when actuated to apply the output of an audio aid to the input of a corresponding amplifier group for simultaneous transmission to all of the instruments in the corresponding group of student instruments.

13. An electronic communication system as defined in claim 12 wherein the output of said K audio amplifiers are coupled via the corresponding ensemble switch to the input of the corresponding group of N amplifiers when the corresponding ensemble switch is actuated in said first position thereof.

14. An electronic communication system as defined in claim 13 and further comprising means associated with each of said K ensemble switches for coupling the inputs of the corresponding ones of said K audio amplifiers together when the corresponding ensemble switches are actuated in a second position thereof.

15. An electronic communication system as defined in claim 14 wherein all of said switches and switch banks are mounted on the fall board of said instructor's keyboard instrument.

16. An electronic communication system as defined in claim 1 wherein said transceiver means of each of said instruments includes a microphone jack and a headphone jack, both of said jacks being mounted adjacent to one of the outer panels of the instrument housing and positioned such that plugs can only be inserted into or withdrawn from said jacks when the adjacent panel is removed from the instrument housing.